US009815041B2

(12) United States Patent
Jiang et al.

(10) Patent No.: US 9,815,041 B2
(45) Date of Patent: Nov. 14, 2017

(54) FLUIDIZED BED REACTOR AND A PROCESS USING SAME TO PRODUCE HIGH PURITY GRANULAR POLYSILICON

(71) Applicant: JIANGSU ZHONGNENG POLYSILICON TECHNOLOGY DEVELOPMENT CO., LTD., Xuzhou, Jiangsu Province (CN)

(72) Inventors: Wenwu Jiang, Xuzhou (CN); Hongfu Jiang, Xuzhou (CN); Feng Wu, Xuzhou (CN); Zhenwu Zhong, Xuzhou (CN); Wenlong Chen, Xuzhou (CN)

(73) Assignee: JIANGSU ZHONGNENG POLYSILICON TECHNOLOGY DEVELOPMENT CO., LTD., Jiangsu Province (CN)

( * ) Notice: Subject to any disclaimer, the term of this patent is extended or adjusted under 35 U.S.C. 154(b) by 0 days.

(21) Appl. No.: 14/785,150

(22) PCT Filed: Apr. 16, 2014

(86) PCT No.: PCT/CN2014/000415
§ 371 (c)(1),
(2) Date: Oct. 16, 2015

(87) PCT Pub. No.: WO2014/169705
PCT Pub. Date: Oct. 23, 2014

(65) Prior Publication Data
US 2016/0067665 A1 Mar. 10, 2016

(30) Foreign Application Priority Data
Apr. 16, 2013 (CN) .......................... 2013 1 0131179

(51) Int. Cl.
*B01J 8/00* (2006.01)
*B01J 8/18* (2006.01)
(Continued)

(52) U.S. Cl.
CPC ............... *B01J 8/24* (2013.01); *B01J 8/1827* (2013.01); *B01J 8/1836* (2013.01); *B01J 8/42* (2013.01);
(Continued)

(58) Field of Classification Search
CPC ..... B01J 8/00; B01J 8/18; B01J 8/1818; B01J 8/1827; B01J 8/1836; B01J 8/24;
(Continued)

(56) References Cited

U.S. PATENT DOCUMENTS 3,012,861 A 12/1961 Ling
4,786,477 A 11/1988 Yoon et al.
(Continued)

FOREIGN PATENT DOCUMENTS

CN 1778671 A 5/2006
CN 101318654 A 12/2008
(Continued)

OTHER PUBLICATIONS

Extended European Search Report corresponding to Application No. 14785316.2-1370/2987771 PCT/CN2014/000415; Date of Mailing: Oct. 26, 2016.
(Continued)

Primary Examiner — Natasha Young
(74) Attorney, Agent, or Firm — Cantor Colburn LLP

(57) ABSTRACT

The present invention relates to a fluidized bed reactor, comprising a reaction tube, a distributor and a heating device, the reaction tube and the distributor at the bottom of the reaction tube composing a closed space, the distributor comprising a gas inlet and a product outlet, and the reaction tube comprising a tail gas outlet and a seed inlet at the top or upper part respectively, characterized in that the reaction tube comprises a reaction inner tube and a reaction outer tube, and the heating device is an induction heating device
(Continued)

placed within a hollow cavity formed between the external wall of the reaction inner tube and the internal wall of the reaction outer tube, wherein the hollow cavity is filled with hydrogen, nitrogen or inert gas for protection, and is able to maintain a pressure of about 0.01 to about 5 MPa; and also to a process of producing high purity granular polysilicon using the reactor. The fluidized bed reactor according to the present invention uses induction heating to heat directly the silicon particles inside the reaction chamber, such that the temperature of the reaction tube is lower than that inside the reaction chamber, which accordingly avoids deposition on the tube wall and results in more uniform heating, and thus is useful for large diameter fluidized bed reactors with much increased output for a single reactor.

12 Claims, 4 Drawing Sheets

(51) Int. Cl.

| | | |
|---|---|---|
| *B01J 8/24* | (2006.01) | |
| *B01J 8/42* | (2006.01) | |
| *B01J 19/00* | (2006.01) | |
| *B01J 19/02* | (2006.01) | |
| *B01J 19/24* | (2006.01) | |
| *C01B 33/00* | (2006.01) | |
| *C01B 33/02* | (2006.01) | |
| *C01B 33/021* | (2006.01) | |
| *C01B 33/027* | (2006.01) | |
| *C01B 33/03* | (2006.01) | |

(52) U.S. Cl.
CPC ............... *B01J 19/02* (2013.01); *C01B 33/03* (2013.01); *B01J 2208/00433* (2013.01); *B01J 2208/00469* (2013.01); *B01J 2208/00893* (2013.01); *B01J 2208/00902* (2013.01); *B01J 2219/0209* (2013.01); *B01J 2219/0218* (2013.01); *B01J 2219/0227* (2013.01); *B01J 2219/0263* (2013.01); *B01J 2219/0286* (2013.01)

(58) Field of Classification Search
CPC ..... B01J 8/42; B01J 19/00; B01J 19/02; B01J 19/24; B01J 2208/00–2208/00017; B01J 2208/00433; B01J 2208/00469; B01J 2208/00796; B01J 2208/00893; B01J 2208/00902; B01J 2219/02; B01J 2219/0204; B01J 2219/0209; B01J 2219/0218; B01J 2219/0227; B01J 2219/025; B01J 2219/0263; B01J 2219/0277; B01J 2219/0286; C01B 33/00–33/021; C01B 33/027; C01B 33/03
See application file for complete search history.

(56) References Cited

U.S. PATENT DOCUMENTS

| | | | |
|---|---|---|---|
| 4,883,687 A | 11/1989 | Gautreaux et al. | |
| 5,260,538 A | 11/1993 | Clary et al. | |
| 7,029,632 B1 | 4/2006 | Weidhaus et al. | |
| 7,771,687 B2 * | 8/2010 | Kim | C01B 33/027 422/139 |
| 8,858,894 B2 * | 10/2014 | Stocklinger | B01J 15/00 422/129 |
| 2002/0081250 A1 | 6/2002 | Lord | |
| 2013/0084233 A1 | 4/2013 | Bhusarapu et al. | |

FOREIGN PATENT DOCUMENTS

| | | |
|---|---|---|
| CN | 101378989 A | 3/2009 |
| CN | 101432470 A | 5/2009 |
| CN | 101780956 A | 7/2010 |
| CN | 102745692 A | 10/2012 |
| CN | 203295205 U | 11/2013 |
| CN | 103523786 A | 1/2014 |
| KR | 100661284 B1 | 12/2006 |
| TW | 201142069 A | 12/2011 |
| WO | 2007091834 A1 | 8/2007 |
| WO | WO 2008/018760 A1 * | 2/2008 |
| WO | WO 2010/083899 A1 * | 7/2010 |

OTHER PUBLICATIONS

International Search Report corresponding to Application No. PCT/CN2014/000415; Date of Mailing: Jul. 15, 2014, with English translation.
English Text of the Chinese Document from Office Action dated Jun. 23, 2016, of "High Frequency Induction Heating"; FPCH14160048; 1 page.
SIPO Office Action corresponding to Chinese Application No. 2201310131179.X; Mailing date of Feb. 3, 2016.
SIPO Office Action corresponding to Chinese Application No. 201310131179.X; Mailing date of Jun. 23, 2016.
Taiwan Patent Office, Search Report corresponding to TW Application No. 103113870; Issued Mar. 15, 2017
Korean First Office Action for corresponding KR Application No. 10-2015-7032652; dated Jun. 20, 2017.

* cited by examiner

FLUIDIZED BED REACTOR AND A PROCESS USING SAME TO PRODUCE HIGH PURITY GRANULAR POLYSILICON

CROSS REFERENCE TO RELATED APPLICATIONS

This is the U.S. national stage of application No. PCT/CN2014/000415, filed on Apr. 16, 2014 and published as WO 2014/169705. Priority under 35 U.S.C. §119(a) and 35 U.S.C. §365(b) is claimed from Chinese Application No. 201310131179.X, filed Apr. 16, 2013, the disclosure of which is also incorporated herein by reference.

TECHNICAL FIELD

The present invention relates to the production of polysilicon, specifically to a fluidized bed reactor using induction heating and to a process using the reactor to produce high purity granular polysilicon.

BACKGROUND

Highly pure polysilicon material is a fundamental raw material for the semiconductor and photovoltaic industries. As the development of distributed photovoltaic power generation, the photovoltaic market is growing, which will in turn promote the rapid development of the polysilicon industry. The processes for preparing polysilicon comprise modified Siemens method, metallurgy method, fluidized bed method and the like. Among others, the modified Siemens method produces more than 80% of polysilicon of the total output of the world, which method comprises the crucial production process of feeding trichlorosilane, after purification by rectification, together with highly pure hydrogen into a reactor, subjecting to a chemical vapor deposition reaction on the surface of a silicon core (the silicon core is heated to 1000-1150° C.) in the reactor, and growing gradually the silicon core to be rod-like polysilicon. The unreacted trichlorosilane, dichlorosilane, silicon tetrachloride, hydrogen and hydrogen chloride contained in the tail gas are recovered through purification by a tail gas recovery process. For the modified Siemens method, it is necessary to shutdown the reactor to take out "silicon rod" (the rod-like polysilicon product) after growing to certain size, such that the batch operation comprising starting and shutting down the reactor not only wastes abundant heat, but also decreases largely the output of the reactor.

Accordingly, the fluidized bed process is being more and more interested by those skilled persons as it is a process having a large deposition surface area, a low energy consumption for chemical vapor deposition and a continuous operation to produce polysilicon. The fluidized bed process is a process to produce polysilicon developed early by Union Carbide. The process produces a granular polysilicon product by using silicon tetrachloride (SiCl4), H2, HCl and industrial silicon as raw materials, generating trichlorosilane (SiHCl3) in a high pressure, high temperature fluidized bed (boiling bed), subjecting the SiHCl3 to a further disporportionation hydrogenation reaction to generate dichlorosilane (SiH2Cl2), followed by a disporportionation to generate silane, and feeding the silane or chlorosilane into a fluidized bed reactor added with granular silicon seed (also called as "silicon seed") at a reaction temperature of 500-1200° C. for a continuous thermolysis reaction. According to the categories of the silicon-containing gas fed into the fluidized bed reactor, the beds are generally classified into silane fluidized bed and chlorosilane fluidized bed (e.g. trichlorosilane fluidized bed). As the granular silicon particles taking part in the reaction in the fluidized bed reactor have a large surface area, the process leads to a high production efficiency, a low power consumption and a low cost. Another advantage of the fluidized bed process is: during the downstream growth of crystals, the silicon particles can be loaded directly into a crucible where the crystals grow, while the rod-like polysilicon product produced by the conventional modified Siemens method needs to be fractured and sorted before being loaded into the crucible, and needs additionally a series of technical processes, such as etch with highly pure inorganic acid, rinse with ultrapure water, drying and treatment in clean conditions. Therefore, the rod-like polysilicon product leads to a high cost of post treatment compared with granular silicon, and contamination is readily to be involved during the post treatment.

Currently, most of the fluidized bed reactors use the external heating, i.e., a way of providing heat by externally heating the particles of the fluidized bed, such as heating by liner and/or reactor isolating layer. U.S. Pat. No. 4,786,477 discloses a microwave heated fluidized bed reactor, which microwave heats the silicon particles with a microwave generator outside the reactor. Such a method allows the reactor internal wall to have a temperature lower than that of the silicon particles, but it needs a specific microwave generator, which is costly. U.S. Pat. No. 7,029,632 discloses a radiation heated fluidized bed reactor, which radiation heats the reaction zone with a heat source peripheral to the reactor inner tube. U.S. Pat. No. 4,883,687 discloses another way of external heating. Such a way of external heating by heat radiation or heat conduction results in the temperature of the reactor greater than the temperature of the materials inside the reactor, which is readily to cause the deposition of polysilicon on the internal wall of the reactor, and to prevent the heat transferring toward inside of the fluidized bed. Accordingly, such a way of heating generally brings large energy loss to the system. In particular, such contradiction is being more significant as the large-scaling of fluidized beds, where the temperature of the reactor wall is too high and deposition of silicon occurs, whilst the temperature of the reactor center cannot reach the decomposition temperature of the silane or chlorosilane, which not only affects adversely the production efficiency of the reactor, but also makes it necessary to shutdown the reactor due to the silicon deposition on the wall for detection, cleaning or replacement, such that the production capacity is limited.

Generally, the deposition on the reactor wall can be depressed by separate the heating zone and the reaction zone. For example, US 2002/0081250 discloses a fluidized bed reactor having separately a heating zone and a reaction zone, with the heating zone positioned below the reaction zone. CN 200810116150.3 further isolates apart the heating zone and the reaction zone, so as to form an external circulation outside the reactor. The way of external heating has a significant disadvantage of poor uniformity of heating, particularly for a large size fluidized bed reactor, resulting in low heating efficiency and large temperature difference between the reactor wall and the reactor center, which leads to poor safety, tendency of deposition of silicon powder on the reactor wall and poor product purity. The way of internal heating the fluidized bed reactor also has the defect of readily depositing silicon on the heating device.

CN 201010116785.0 discloses a fluidized bed reactor with internal heating, which separate the reactor into a heating zone and a reaction zone with a guide cylinder in the reactor, wherein the heating zone heats the silicon particles through a electric-resistance heating element, and the heating zone is not fed with a silicon-containing gas, so as to decrease the wall surface deposition. CN102745692A discloses a fluidized bed reactor with internal heating, which provides heat through supplying power to a electric-resistance element extending into the fluidized bed and connecting with a pole, wherein the resistance element is made of at least one of ceramics (such as graphite, silicon carbide and the like) and metals, and the resistance heating element is equipped with an outside protective case, where the surface of the protective case has preferably a coating or lining of silicon, silica, quartz, silicon nitride or the like. CN 200780015545.8 discloses a fluidized bed reactor with internal heating, which heats through a resistance heating element at the bottom, ejects the silicon-containing gas into a reaction zone through a nozzle extending into the reaction zone, so as to avoid the deposition of silicon in the heating zone. However, the intensive back mixing performance of the fluidized bed results in a part of the silicon-containing gas into the heating zone. As the temperature of the heating element is higher than that of the gas phase and the solid particles, deposition occurs on the heating element, which will finally result in decreased heating efficiency, and even may cause the shutdown of the system or replacement of the heating element, so as to affect adversely the operation cycle of the reactor and the production capacity of the reactor.

Therefore, there is still a need for a novel fluidized bed reactor for producing high purity granular polysilicon, which overcomes the foregoing defects, so as not only to decrease the temperature of the reactor internal wall and thus reduce the silicon deposition on the internal wall, but also to increase the purity of the granular silicon product and reduce the cost. In addition, it allows the industrialized application of a large size reactor, the increased output of the reactor, easy installation and excellent safety.

By study, it is discovered that the magnetic intensity at any point in a circle planar coil is equal or approximately equal to each other. Considering that the induction heating heats only conductors within the magnetic field, the inventors of the present invention incorporate the induction heating into a fluidized bed reactor. That is, induction heating is used for a granular silicon fluidized bed. Accordingly, even if the diameter of the bed is relatively large, the magnetic intensities in the fluidized bed center and those in the peripheral inside the bed are equal or approximately equal to each other, so as to solve the severe problem of difficulty in heating and deposition on the internal wall brought by large-scaling the fluidized bed. By further study, the present invention is thus achieved.

SUMMARY OF THE INVENTION

The purpose of the invention is to provide a new fluidized bed reactor with induction heating for producing granular polysilicon, which utilizes the way of induction heating to supply heat to the silicon particles within the reactor. Using the inventive technical solution, the purity of the product obtained can be increased, the cost can be decreased, the industrialized application of reactors with large diameters is allowed, and the temperature of the internal wall of the reactor can be decreased so as to decrease the deposition of silicon on the internal wall.

Another purpose of the present invention is to provide a process of producing high purity granular polysilicon using such a fluidized bed reactor.

In order to achieve the purposes above and the desired technical effect, the present invention provides the following technical solutions of:

A fluidized bed reactor, comprising a reaction tube, a distributor and a heating device, the reaction tube and the distributor at the bottom of the reaction tube composing a closed space, the distributor comprising a gas inlet and a product outlet, and the reaction tube comprising a tail gas outlet and a seed inlet at the top or upper part, characterized in that the reaction tube comprises a reaction inner tube and a reaction outer tube, and the heating device is an induction heating device placed within a hollow cavity formed between the external wall of the reaction inner tube and the internal wall of the reaction outer tube, wherein the hollow cavity is filled with hydrogen, nitrogen or inert gas for protection, and is able to maintain a pressure of about 0.01 to about 5 MPa. The reaction inner tube and reaction outer tube of the reactor are coaxial tubes having different diameters. In the reaction zone (a straight cylinder section) of the reactor, the part of the reaction inner tube and the part of the reaction outer tube are not jointed tightly to one another, but form the hollow cavity as stated above for placing the induction heating device; while in the free space zone (an expanding section), the part of the reaction inner tube and the part of the reaction outer tube can be jointed tightly to one another.

In an embodiment, the induction heating device is an induction coil, and the induction coil twists around the reaction inner tube taking the central axis of the reaction inner tube as the central axis. Further, the induction coil is provided in form of one or more sets, for example 2-10 sets of induction coils, such as two sets, three sets, four sets, five sets, six sets, seven sets, eight sets, nine sets, ten sets or more, preferably three sets, four sets, five sets or six sets induction coils. The magnetic intensity of the induction heating device and/or the heating power generated therefrom are not specifically limited, as long as the subject to be heated can be heated to the required temperature, such as about 600 to about 1200° C.

In a preferable embodiment, the reaction inner tube further comprises an inside liner, where the liner and/or the reaction outer tube have a detachable structure. More preferably, the material of the liner is quartz, graphite or silicon carbide. Further preferably, the graphite or silicon carbide liner has a coating of at least one of quartz, silicon carbide, silicon nitride and silicon on its internal surface. For example, the liner material is preferably quartz or silicon carbide.

In a preferable embodiment, the reaction inner tube further comprises an thermal-insulating layer on the outside. Preferably, the insulating layer is made of at least one heat-insulating material of ceramics or C-C composite.

In a preferable embodiment, the material of the reaction outer tube is at least one of metal, metal alloy, carbon steel, stainless steel and other alloy steels. In a preferable embodiment, the material of the reaction inner tube is at least one of quartz, graphite, silica, silicon carbide, silicon nitride, boron nitride, zirconia and silicon. For example, the material of the reaction inner tube is preferably quartz.

In a preferable embodiment, the distributor has a structure of three layers, consisting of an upper, an intermediate and a lower plate. The upper and intermediate plates compose a cavity for a cooling fluid connecting with the inlet and outlet conduits of the cooling fluid. The intermediate and lower plates compose a cavity for a mixed feeding gas connecting with the feeding gas conduit, and the mixed gas comprising a silicon-containing raw gas and a fluidizing gas is injected into the fluidized bed reactor through one or more nozzles.

In a preferable embodiment, the fluidized bed reactor further comprises, inside the reactor, an inside preheating/heating device. Preferably, the inside preheating/heating device is one or more ferromagnetic members extending into the reactor. The inside preheating/heating device is preferably a ferromagnetic member in a rod-like, strip or tabular form, such as an iron rod, an iron strip or an iron plate, but not limited thereto. Preferably, the inside preheating/heating device is placed as coaxial with the reaction inner tube. Therefore, in an embodiment, when the inside preheating/heating device is a ferromagnetic member, it is preferably placed at the central site of the inner tube. In another embodiment, when the inside preheating/heating device is a plurality of ferromagnetic members, they are preferably placed around the central axis of the reaction inner tube, preferably placed uniformly around the central axis. In an embodiment, one of the plurality of ferromagnetic members is preferably placed at the central site of the reaction inner tube. Preferably, a protective case is placed on the periphery of the inside preheating/heating device, which protective case is made of at least one inorganic material non-deformable at high temperatures selected from the group consisting of quartz, silica, silicon nitride, boron nitride, zirconia, yttria and silicon. For example, the protective case is made preferably of quartz or silicon nitride. More preferably, the protective case is hollow and is porous on the outer surface, wherein the hollow part of the protective case is fed with a protective gas to avoid silicon deposition on the surface of the protective case. In particular, when the inside preheating/heating device is a plurality of ferromagnetic members, one single protective case can be provided to contain all the ferromagnetic members, or a plurality of protective cases can be provided to contain the ferromagnetic members respectively. When one protective case is provided, the protective case is preferably placed as coaxial with the reaction inner tube. Therefore, in an embodiment, the reaction outer tube, the reaction inner tube, the induction heating device, optionally the inside preheating/heating device and optionally the one protective case are all coaxial. When more than one protective cases are provided, each protective case contains one or more of the ferromagnetic members. Similarly, the plurality of the member protective cases are placed respectively as coaxial with one ferromagnetic member contained therein, or as coaxial with the geometrical center of the plurality of ferromagnetic members contained therein. Moreover, there isn't any specific limit on the diameters and/or the cross-sectional areas of the inside preheating/heating device and the protective case as well as the ratios thereof to the diameter and/or the cross-sectional area of the reactor, as long as the purpose of preheating/heating required can be achieved and the generation of polysilicon is not affected adversely.

According to another embodiment of the present invention, the present invention provides a process of producing high purity granular polysilicon, comprising the steps of:

a) adding silicon seed particles through a seed feeding inlet to the fluidized bed reactor according to the present invention, and adding a silicon-containing raw gas and a fluidizing gas through the distributor, so as to fluidize the silicon seed particles to form a fluidized bed;

b) heating through the induction heating device to heat the fluidized bed to a temperature of about 600□ to about 1200□; preferably about 6000 to about 1000□, further preferably about 900□ to about 1000□.

c) pyrolysing the silicon-containing raw gas and depositing silicon on the surface of the seed particles, till the silicon seed particles growing to obtain a product of high purity granular polysilicon.

In an embodiment, the silicon-containing raw gas is selected from the group consisting of $SiH_aX_b$, wherein a and b are integers independently selected from the group consisting of 0-4 (the silicon-containing raw material can be, such as, trichlorosilane, dichlorosilane, silane and the like), and a+b=4, X=F, Cl, Br, or I. The fluidizing gas is selected from the group consisting of hydrogen and inert gases, such as helium, neon, argon or the like.

In an embodiment, the silicon-containing raw gas is selected from the group consisting of silane ($SiH_4$) and trichlorosilane ($SiHCl_3$).

In an embodiment, the input of the silicon-containing raw gas and the fluidizing gas is maintained at a flow rate of about 1.1 to about 5.0 Umf.

In an embodiment, the silicon seed and/or the silicon-containing raw gas and/or the fluidizing gas are preheated to about 300 to about 500° C. prior to being fed into the fluidized bed reactor.

In an embodiment, a cooling fluid at a temperature of about 30 to about 500□ is introduced into the cooling fluid cavity of the distributor to cool the distributor to a temperature lower than the decomposition temperature of the silicon-containing, e.g., as low as about 300 to about 500° C., preferably lower than about 400° C., more preferably lower than about 350° C., further preferably lower than about 300° C., so as to avoid silicon deposition on the distributor surface, which clogs the feeding gas nozzle and influences adversely the production capacity.

According to the fluidized bed reactor of the present invention, as the induction heating is used in place of the conventional radiation heating or electric-resistance heating, an induced magnetic field generated directly by a medium frequency or high frequency alternating current heats directly the granular silicon conductors inside the reactor to provide heat required by the bed, such that the bottleneck of the reactor size restricted by the conventional heating way of heat radiation or heat conduction through the reactor wall is broken. The technical solution according to the present invention can apply to a large size fluidized bed reactor having a large diameter to provide heat to the large size fluidized bed reactor, so as to achieve the breakthrough of an output in the order of Kiloton per year for a single reactor, e.g. 1000 Ton-9000 Ton or more.

According to the fluidized bed reactor of the present invention, as the resistivity of silicon decreases significantly above 400° C., and the higher the temperature, the less the resistivity is, the way of induction heating can be used to heat the silicon particles inside the reactor, avoiding a severe deposition of silicon on the reactor wall caused by the reactor wall temperature much higher than that of the internal temperature of the reactor due to the conventional heating ways of radiation heating and resistance heating which utilizes heat radiation or heat conduction through the reactor wall. Consequently, the periodical etch of the reactor wall is avoided, and the frequent shutdown of the system for detection, maintenance or replacement of the reactor wall or liner is unnecessary, which thus prolongs the operation cycle of the reactor, increases the production efficiency and the yearly output of the reactor, and reduces the cost.

According to the fluidized bed reactor of the present invention, the induction heating reduces significantly the reactor wall temperature, so as to eliminate the defect of easy etch of the reactor wall at a high temperature, and to avoid the tendency of polluting the reactor wall at a high temperature, such that the present invention can increase the purity of the granular polysilicon.

In an embodiment, according to the fluidized bed reactor of the present invention, as the reactor liner and/or the reaction outer tube and the thermal insulating layer can all be detachable structures, i.e., being assembled by a plurality of small pieces, to form a fixed and sealed liner or outer tube structure, the difficulty of processing is reduced and installation and maintenance are easy.

In an embodiment, the fluidized bed reactor according to the present invention comprises a reaction inner tube and a reaction outer tube, where the inner tube further has a liner on the inside, the reaction outer tube has a thermal insulating layer on the inside, and the cavity formed between the inside and outside tubes is charged with a protective gas and has a positive pressure or slightly positive pressure, which leads the reactor to good safety. Such a layered structure of double shells, thermal insulating layer and liner reduces the requirement on the materials of the reaction inner tube and the reaction outer tube, so as to reduce the cost of the reactor.

In an embodiment, according to the fluidized bed reactor of the present invention, the inside preheating/heating device is just a ferromagnetic member fixed to the distributor or top of the reactor, which does not involve any complicated electric circuit or electric insulation, and thus is simple and safe. In particular, at the initial stage of the reaction, the ferromagnetic member generates heat through induction by the alternating magnetic field to act as a heat source for the silicon seed inside the large size fluidized bed reactor, such that the granular silicon seed can be heated rapidly. Meanwhile, the inside preheating/heating device can serve in turn to break bubbles, avoiding the problems of overload and ease to bubble damaging the fluidization brought by the large-scaling of the fluidized bed reactor.

Figure 1:
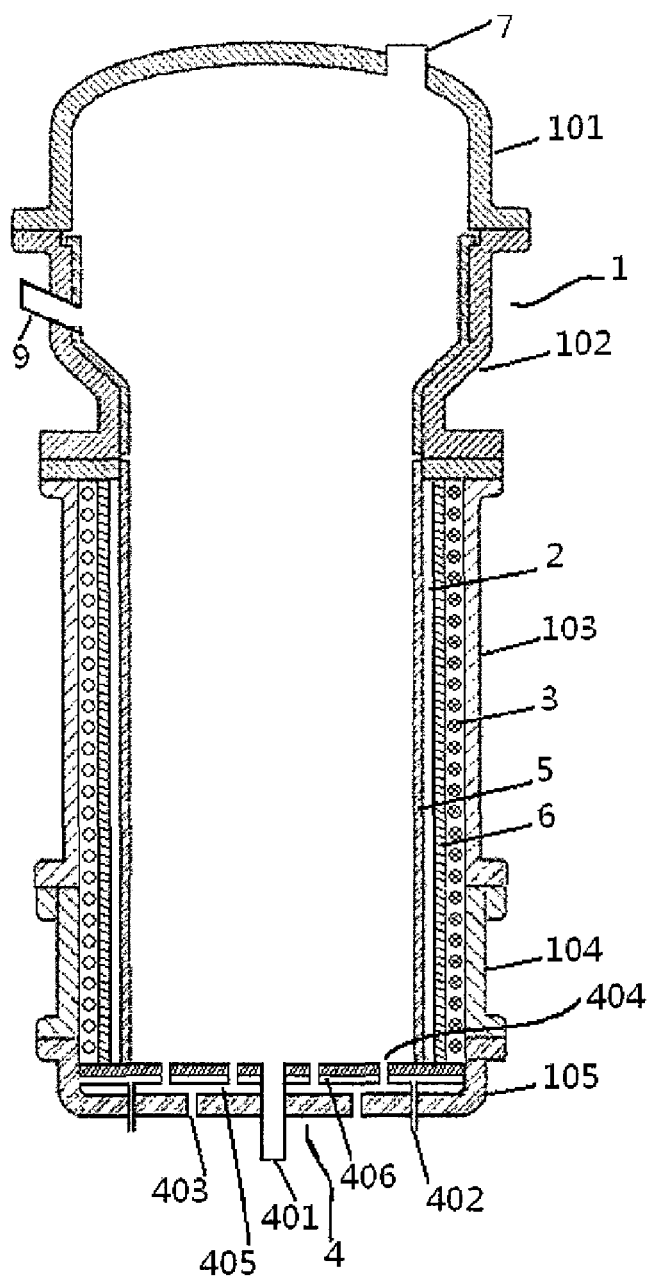
FIG. 1 shows the fluidized bed reactor according to the present invention.

Wherein, 1 denotes reaction outer tube, 2 denotes reaction inner tube, 3 denotes induction heating device, 4 denotes gas distributor, 5 denotes liner, 6 denotes thermal insulating layer, 7 denotes tail gas outlet, 8 denotes inside preheating/heating device, 9 denotes seed feeding inlet, 101 denotes top, 102 denotes expanding section, 103 and 104 denote straight tube section, 105 denotes bottom, 301, 302 and 303 denote coil sets, 401 denotes product outlet, 402 denotes cooling fluid inlet/outlet, 403 denotes gas inlet, 404 denotes nozzle, 405 denotes cavity for the mixed feeding gas, 406 denotes cooling fluid cavity, 801 denotes ferromagnetic member, 802 denotes protective case, 803 denotes protective gas feeding conduit.

Embodiments

The embodiments of the present invention will be illustrated below referring to the drawings; however, it should be understood that the protection scopes of the present invention are not limited to the embodiments, wherein the specific materials and reactor structures involved in the embodiments are provided for the purpose of illustrating the present invention, without any restriction to the present invention. The protection scopes of the present invention are determined by the claims.

FIG. 1 shows an embodiment according to the present invention, wherein the fluidized bed reactor comprises a reaction tube consisting of a reaction inner tube 2 and a reaction outer tube 1, a gas distributor 4 and an induction heating device 3. The reaction tube and the gas distributor 4 at the bottom of the reaction tube compose a closed space of the reaction chamber, wherein the gas distributor 4 comprises a gas inlet 403 and a product outlet 401, and the reaction tube comprises a tail gas outlet 7 and a seed feeding inlet 9 at the top or upper part thereof. The reaction outer tube comprises generally a top 101, an expanding section 102, a straight tube section 103 and 104, and/or a bottom 105. Generally, the seed feeding inlet 9 can be positioned at the top 101 or at the expanding section 102 of the reaction tube, which is known to those skilled in the art. The induction heating device 3 is placed in the hollow cavity between the reaction inner tube 2 and the reaction outer tube 1. The hollow cavity is filled with hydrogen, nitrogen or an inert gas for protection. Compared with the pressure inside the fluidized bed reactor, the hollow cavity is maintained at a positive pressure or slightly positive pressure, e.g. at a pressure of about 0.01 to about 5.0 MPa, preferably about 0.1 to about 2.0 MPa, more preferably about 1.0 to about 1.5 MPa. The positive or slightly positive pressure environment in the hollow cavity prevents the reaction inner tube 2 from breaking of the tube wall caused by the impact within the reactor. Meanwhile, the hydrogen or nitrogen or an inert gas can avoid etch of the induction coil by the chloric gas due to the breakage of the reaction inner tube 2, so as to protect the coil and the reaction outer tube. In addition, the positive or slightly positive pressure environment also benefits the high pressure operation of the fluidized bed reactor, i.e., operation of the fluidized bed reactor at an elevated pressure, which promotes increasing the efficiency of deposition. For example, the pressure in the fluidized bed reactor is slightly lower than that in the hollow cavity formed between the reaction inner tube 2 and the reaction outer tube 1. For example, the pressure in the fluidized bed reactor is maintained at about 0.01 to about 5.0 MPa, preferably about 0.1 to about 4.0 MPa, more preferably about 1.0 to about 3.0 MPa, provided that the pressure is slightly lower than that in the hollow cavity. Therefore, the positive or slightly positive pressure environment in the hollow cavity formed between the reaction inner tube 2 and reaction outer tube 1 benefits generally the long-time cycle and high efficiency operation, while the pressure in the hollow cavity equal to that in the reactor will not affect adversely the normal operation of the reactor and thus is also within the scope of the invention. Generally, the inert gas according to the present invention means helium, neon, argon, krypton, or xenon, preferably argon or helium. The hollow cavity is preferably filled with hydrogen, nitrogen or argon, or a combination thereof. It should be understood that the hollow cavity is obviously connected with an essential gas inlet conduit and outlet conduit, and comprises essential valves and instruments, e.g., pressure gauge, through which to determine the leakage of the reaction inner tube by monitoring the pressures of the gases in and out, so as to avoid the damage of the induction heating device and others of the reactor. Of course, it is also possible to measure the contents of the components of the gases into and out of the hollow cavity, to evaluate the environmental change of the cavity between the inside and outside tubes, so as to in turn modulate the production conditions, avoiding any more significant loss.

Moreover, the bottom 105 of the fluidized bed reactor exemplified by FIG. 1 has a planar construction, which means the fluidized bed has a shape of straight cylinder. However, as known by those skilled in the art, the bottom of the fluidized bed reactor can also has alternatively a downward cone structure, which means the bottom of the reactor be conoid or spherical or ellipsoidal, which structure benefits the collection of the product of granular silicon. Likewise, the gas distributor and the cooling thereof, the product outlet and so on can all refer to the technical solutions provided by the present invention, or can be the forms conventionally known in the art.

In the embodiment exemplified by FIG. 1, the reaction inner tube 2 can further comprise an inside liner 5, where the material of the liner 5 is quartz, graphite or silicon carbide, and the graphite is highly pure graphite. Preferably, in order to prevent any contamination caused by the incorporation of carbon from the graphite into the silicon, when the liner 5 is graphite or silicon carbide, the graphite liner has a coating of at least one of quartz, silicon nitride and silicon on the surface, preferably a coating of silicon or silicon nitride. The reaction inner tube 2 can further comprise an thermal insulating layer 6 on the outside (i.e., the main structure of the reactor consisting, from outside to inside, of the reaction outer tube 1, the induction coil 3, the insulating layer 6, the reaction inner tube 2 and the liner 5). The thermal insulating layer 6 is made of a heat-insulating material of at least one of ceramics and C-C composite, but not limited thereto. For example, the material capable of insulating heat, such as quartz, is also within the scope of the invention, which is conventionally known by those skilled in the art. The C-C composite refers to a completely carbonaceous composite using carbon (or graphite) fiber or a fabric thereof as reinforcing material and carbon (or graphite) as matrix, made by processing and carbonizing treatment, such as carbon fiber, reinforced carbon fiber, carbon foam and so on, but not limited thereto. Preferably, the thermal insulating layer has a detachable structure, such as being formed by jointing parts made of electrically and thermally insulating material. The presence of the thermal insulating layer can avoid effectively the loss of heat, so as to utilize the heat sufficiently. Moreover, the reactor outer tube 1 has a cool wall, benefiting the safe operation.

The material of the reaction outer tube 1 can be at least one of metal, metal alloy, carbon steel, stainless steel and other alloy steels, such as an ordinary stainless steel, 316L stainless steel, carbon steel or incoloy800 alloy, or Hardgrove alloy. Owing to the presence of the reaction inner tube 2, optionally the liner 5 and optionally the thermal insulating layer 6, the requirement on the material of the reaction outer tube 1 is not stringent, so as to have a broader scope for selection, which reduces the cost of the equipment. The material of the reaction inner tube 2 is at least one of quartz, graphite, silica, silicon carbide, silicon nitride, boron nitride, zirconia and silicon. Generally, the reaction inner tube 2 has an integrally sealed structure, such as a graphite internal tank. Preferably, the reaction inner tube 2 is made of a high temperature resistant material having poor electric conductivity, such as quartz or silicon nitride, so as to avoid the induction heating of the reaction inner tube 2 which may otherwise increase the temperature of the reactor internal wall, such that the deposition on the wall surface can be depressed effectively and the operation cycle of the fluidized bed reactor can be increased. The reactor internal wall means the internal surface of the cavity inside the reactor, where the reaction zone (straight cylinder section) of the reactor generally has the liner layer 5 and the reaction inner tube 2, while the free space zone (expanding section) generally hasn't the liner layer 5. Owing to the high temperature resistance and poor electrical conductivity properties of the reaction inner tube, the reaction inner tube will not be inductively heated, such that the temperature of the reactor internal wall is much decreased compared with the conventional electric-resistance radiation heating. The reactor liner 5, the reaction outer tube 1 and the thermal insulating layer 6 can all have detachable structures, i.e., being assembled by a plurality of small pieces, to form a fixed and sealed liner, outer tube or thermal insulating layer structure, such that the difficulty of processing is reduced and installation and maintenance are easy.

The distributor 4 has a structure of three layers, consisting of an upper, an intermediate and a lower plates. The upper and intermediate plates compose a cavity 406 for a cooling fluid connecting with the inlet/outlet conduit 402 of the cooling fluid. The intermediate and lower plates compose a cavity 405 for the mixed feeding gas connecting with the feeding gas conduit 403, and the mixed gas is injected into the fluidized bed reactor through one or more nozzles 404. The cooling fluid fed into the cooling fluid cavity 406 can be gas or liquid, such as an inert gas, hydrogen or nitrogen, or cooling water or heat transfer oil and so on. It can be understood that the silicon-containing raw gas and/or the fluidizing gas can be premixed or be mixed sufficiently in the cavity 405, buffered and fed into the inner space of the reactor through one or more nozzles 404, so as to allow the silicon seed particles fluidizing and reacting to deposit on the silicon seed surface, so as to obtain the highly pure granular silicon product. The mixed gas is fed into the fluidized bed reactor through the gas distributor 4 to achieve a more uniform distribution. As the induction heating heats primary the granular silicon conductors inside the reactor, the internal wall of the reactor does not suffer to the severe problem of silicon deposition on the reactor wall encountered by the conventional heating way of heat radiation or conduction by the reactor wall. Accordingly, the gas distributor 4 can be integrity, and unnecessary to be divided into a central inlet and a periphery inlet, even further eliminating the need of feeding inert gas through the periphery inlet to protect the reactor wall. Of course, the present invention does not set any specific limitation on the distribution form of the nozzles of the distributor 4. A way of the combined use of a central inlet and a periphery inlet for feeding gas can also be used; or alternatively, the use of only nozzles without any gas distributor for feeding gas also falls in the scope of the present invention. The surface of the gas distributor 4 preferably has a coating of at least one of quartz, silicon carbide, silicon nitride and silicon, to prevent the high purity granular polysilicon from being polluted by the metallic impurity on the surface of the gas distributor.

As the induction heating is used in place of the conventional radiation heating or electric resistance heating, an induced magnetic field generated directly by an medium frequency or high frequency alternating current heats directly the granular silicon conductor inside the reactor to provide heat required by the bed, such that the bottleneck of the reactor size restricted by the conventional heating way of heat radiation or heat conduction through the reactor wall is broken. The technical solution according to the present invention can apply to a large size fluidized bed reactor having a large diameter to provide heat to the large size fluidized bed reactor, so as to achieve the breakthrough of an output in the order of Kiloton per year for a single reactor, e.g. 1000 Ton-9000 Ton. In addition, as the resistivity of silicon decreases significantly above 400° C., the way of induction heating according to the present invention can be used to heat the silicon particles inside the reactor, avoiding the severe deposition of silicon on the reactor wall caused by the reactor wall temperature much higher than that of the internal temperature of the reactor due to the conventional heating ways of radiation heating and resistance heating which utilizes heat radiation or heat conduction through the reactor wall. Consequently, the frequent shutdown of the system for detection, maintenance or replacement of the reactor wall or liner is unnecessary, which thus prolongs the operation cycle of the reactor, increases the production efficiency and the yearly output of the reactor, and reduces the cost. Meanwhile, the way of induction heating reduces significantly the reactor wall temperature, so as to avoid the tendency of polluting the reactor wall at a high temperature, such that the present invention can increase the purity of the granular polysilicon.

Figure 2:
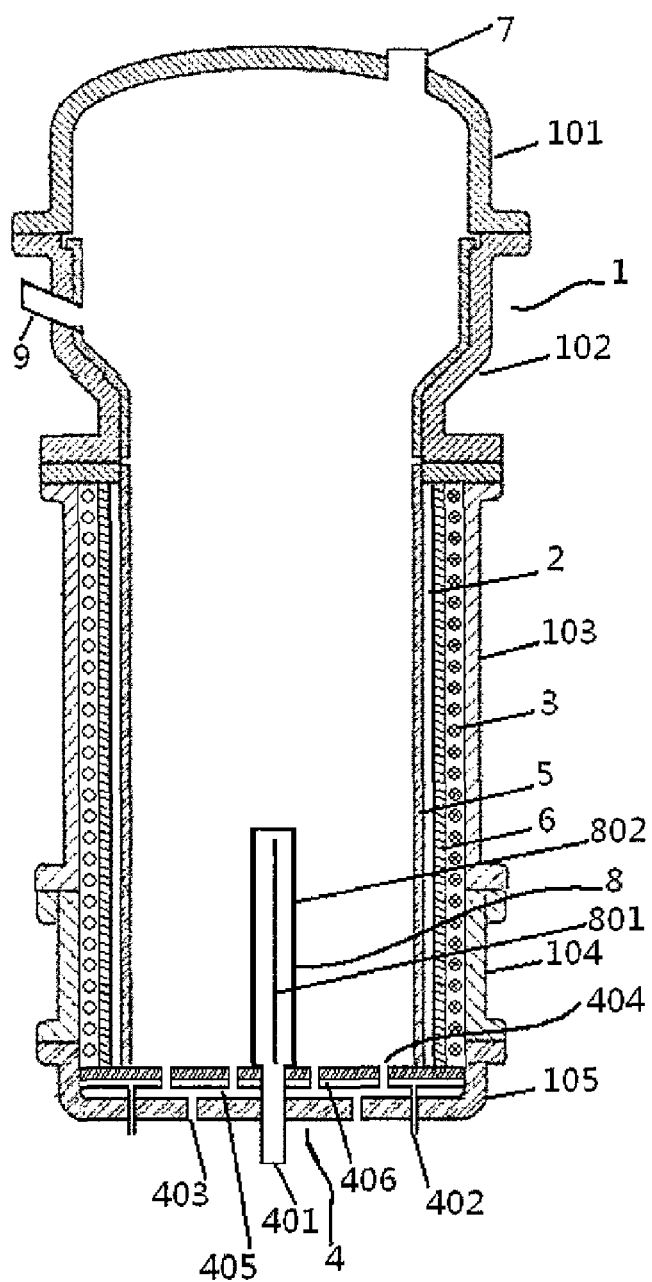
FIG. 2 shows another embodiment of the fluidized bed reactor according to the present invention.
Figure 4:
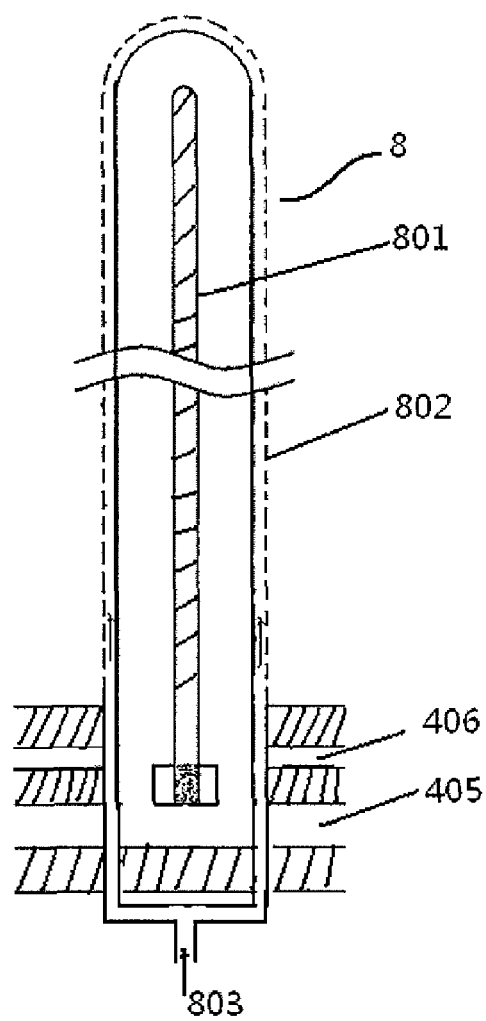
FIG. 4 shows the way of preheating/heating inside the fluidized bed reactor according to the present invention.

FIG. 2 shows a modification for the embodiment showed by FIG. 1. As showed by FIG. 2 and FIG. 4, in a preferable embodiment, the fluidized bed reactor further comprises, inside the reactor, an inside preheating/heating device 8. The inside preheating/heating device is such as a ferromagnetic member 801 extending into the reactor. The inside preheating/heating device is preferably a ferromagnetic member in a rod-like, strip, tabular or cylinder form, such as an iron rod, an iron strip or an iron plate, but not limited thereto. In an embodiment, the inside preheating/heating device 8 is an inside auxiliary heating device, while the induction heating is the main way for heating. Specifically, in the start up stage of the reactor, the granular silicon seed is heated rapidly due to the property of easy induction heating of a ferromagnet, such that the granular silicon seed becomes a conductor rapidly; while during the normal operation of the reactor, the inside auxiliary heating device is just heated to a temperature lower than the decomposition temperature of the silicon-containing material. For example, regarding a silane fluidized bed system, the protective case 802 is cooled to about 400 to about 500° C.; while regarding a chlorosilane fluidized bed system, the protective case 802 is cooled to about 500 to about 800° C. Here, preferably, a protective case 802 is placed on the periphery of the inside preheating/heating device, which protective case 802 is made of at least one inorganic material non-deformable at high temperatures selected from quartz, silica, silicon nitride, boron nitride, zirconia, yttria and silicon. More preferably, the protective case 802 is hollow and has a porous structure on the external surface (as showed by FIG. 4), such as in the form of bell-jar, to envelope the inside auxiliary heating device. The protective gas is fed into the protective case (i.e., the hollow part thereof) through a protective gas feeding line 803. The protective gas is ejected out through the pores on surface of the protective case 802 and is carried by the outside fluidizing gas upward the reactor, so as to form a gas film on surface of the protective case which acts as a gas protective layer on surface of the protective case 802 to prevent the protective case from a too high temperature leading to silicon deposition on the surface. The protective gas is preferably hydrogen or an inert gas. The temperature of the protective gas can be a room temperature, such as, as low as about 25° C., or can be alternatively as high as about 400° C. or more, preferably about 30 to about 300° C., more preferably about 50 to about 100° C. Generally, regarding a silane fluidized bed system, the protective case 802 is cooled with the protective gas to a temperature at about 400 about 500° C., avoiding a too high temperature leading to the silicon deposition on the protective case surface; while regarding a chlorosilane fluidized bed system, the protective case 802 can be cooled with the protective gas to a temperature at about 500 about 800° C., as the decomposition temperature of chlorosilane is higher.

In another embodiment, the inside preheating/heating device 8 can be the primary inside heating device, i.e., acting as the primary heat source for the reactor inside via the ferromagnetic member 801 extending into the reactor in the start-up and normal operation stages of the reactor. This requires the ferromagnetic member 801 having a cross-sectional area sufficient to have adequate lines of magnetic induction therethrough and being heated by induction. Alternatively, a plurality of inside preheating/heating members 801 are placed to provide sufficient heat source to the fluidized bed reactor, while the induction coil peripheral to the reaction inner tube acts for auxiliary heating or combined heating. In this instance, the protective case 802 peripheral to the inside preheating/heating device 801 needn't be cooled by a protective gas. It is unnecessary for the protective case 802 to be hollow and be porous on the surface. For example, it can be in the form of a monolayer of bell-jar form enveloping the ferromagnetic member 801. It can also be in the form of a hollow jacket, but unnecessary to be porous on the surface. Then, the material of the protective case 802 is different from that acting as the auxiliary heating device above, such as being selected from the group consisting of molybdenum, graphite, and tantalum, but not limited thereto. The protective case surface made of molybdenum, graphite, or tantalum preferably has a coating of at least one of quartz, silicon carbide, silicon nitride and silicon, to prevent the granular silicon product from being polluted by the impurity from the protective case. Without a gas protection for the protective case 802, silicon deposition may occur on surface of the protective case 802, which can be disposed or treated at intervals. In addition, the silicon deposited on surface of the protective case 802 can be peeled off at intervals through the mechanism of expanding with heat and contracting with cold, using the difference of thermal expansivities between the material of molybdenum, graphite or tantalum and the material of silicon.

Specifically, the inside preheating/heating device 8 can be fixed or detachably placed on the gas distributor 4, or can be fixed or detachably hanged on the reactor top 101, and extends downward (preferably vertically downward). The ferromagnetic member can extend into the reactor inside, such as throughout the reaction zone, or two or more inside preheating/heating devices are fixed on the distributor or on the reactor top. As the inside preheating/heating device can be just a ferromagnetic member fixed to the distributor or top of the reactor, which does not involve any complicated electric circuit or electric insulation, and thus is simple and safe. In addition, the ferromagnetic member can not only generate heat through induction by the alternating magnetic field to act as a heat source for the inside of a large size fluidized bed reactor, but also serve in turn to break bubbles, avoiding the problems of overload and ease to bubble damaging the fluidization brought by the large-scaling of the fluidized bed reactor. In particular, at the initial stage from start up till normal operation, the silicon seed particles can be heated by the inside preheating/heating device 8, such that the silicon particles become rapidly conductors to be inductively heated, avoiding the use of a reactor internal tank, an inner tube or a liner of graphite, so as to prevent the granular silicon product from the incorporation of the carbon from graphite. Meanwhile, without the use of a liner or an internal tank of graphite, the induction heating of such a conductor of the graphite internal tank or liner, which leads to an increased temperature on the reactor internal wall causing in turn silicon deposition on the internal wall, can be avoided. Therefore, the use of the inside preheating/heating device can also optimize the selection on material of the reactor internal tank or liner, preventing deposition on the reactor internal wall.

Figure 3:
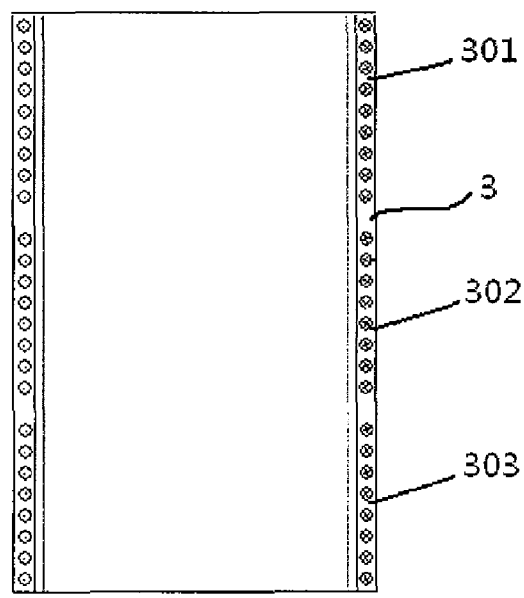
FIG. 3 shows the coil arrangement of the fluidized bed reactor according to the present invention showed by FIGS. 1 and 2.

As showed by FIG. 3, the induction heating device 3 is an induction coil, and the induction coil twists around the reaction inner tube taking the central axis of the reaction inner tube as the central axis, to form a shape of solenoidal. Considering the real power and frequency of the power supply unit, the induction coil can be provided in form of one or more sets, such as four sets, five sets, six sets or more. The three sets of induction coil 301, 302 and 303 are showed by FIG. 3 as an example. In particular for a large size fluidized bed reactor, use of only one set of coil will result in a large load and requires stringently on the wire, whilst the arrangement of a plurality of induction coil sets can reduce the load of each set, benefiting the installation, maintenance and safety of the induction coils.

Regarding a large size fluidized bed reactor, medium frequency or high frequency alternating current is used for the induction heating device, wherein the alternating current can have a frequency of 1 kHz-200 kHz, preferably 5 kHz-100 kHz, more preferably 5 kHz-50 kHz, but not limited thereto, e.g., 20 kHz, 30 kHz, 40 kHz, 45 kHz, 60 kHz, 70 kHz, 80 kHz, 90 kHz and so on.

A fluidized bed reactor using the induction heating can break the bottleneck encountered by the conventional heating ways, so as to allow the large-scaling of fluidized bed reactor without affecting adversely the heating effect. The reaction zone of the reactor can have a diameter in the cross section of about 40 cm, about 45 cm, about 50 cm, about 55 cm, about 60 cm, about 65 cm, about 70 cm, about 75 cm, about 80 cm, about 85 cm, about 90 cm, about 95 cm, about 100 cm, about 105 cm, about 110 cm, about 115 cm, about 120 cm, about 130 cm, about 140 cm, about 150 cm, about 160 cm, about 170 cm, about 180 cm, about 190 cm, about 200 cm or more, without any specific limitation. The output of the fluidized bed reactor according to the present invention can be at least about 100 kg per hour per square meter in the cross-sectional area, or not less than about 115 kg/hr/m2, or not less than about 125 kg/hr/m2, either not less than about 145 kg/hr/m2, or not less than about 165 kg/hr/m2, either not less than about 185 kg/hr/m2, or not less than about 250 kg/hr/m2, either not less than about 325 kg/hr/m2, or not less than about 350 kg/hr/m2. Therefore, the annual output for a single fluidized bed reactor using the induction heating can reach the order of Kiloton, even tens of Kilotons, e.g., 1000t-9000t, or e.g., not less than 1000t, or not less than 1500t, or not less than 2250t, or not less than 4000t, or not less than 6250t, or not less than 9000t, but not limited thereto.

According to another aspect of the present invention, the present invention provides a process of producing high purity granular polysilicon, comprising the steps of:
   a) adding silicon seed particles through a seed feeding inlet to the fluidized bed reactor above, and adding a silicon-containing raw gas and a fluidizing gas through a distributor, so as to fluidize the silicon seed particles to form a fluidized bed;
   b) heating through an induction heating device to heat the fluidized bed to a temperature of about 600☐ to about 1200☐; preferably about 600☐ to about 1000☐, further preferably about 900☐ to about 1000☐; and
   c) pyrolysing the silicon-containing raw gas and depositing silicon on the surface of the seed particles, till the silicon seed particles growing to obtain the product of high purity granular polysilicon.

The silicon-containing raw gas is selected from the group consisting of SiHaXb, wherein a and b are integers independently selected from the group consisting of 0-4, and a+b=4, X=F, Cl, Br, or I; and the fluidizing gas is selected from the group consisting of hydrogen, nitrogen and an inert gas. For example, the silicon-containing gas is selected from the group consisting of silane (SiH4), dichlorosilane (SiH2Cl2), trichlorosilane (SiHCl3), silicon tetrachloride (SiCl4), dibromosilane (SiH2Br2), tribromosilane (SiHBr3), silicon tetrabromide (SiBr4), diiodosilane (SiH2I2), triiodosilane (SiHI3), silicon tetraiodide (SiI4), and a mixture thereof, and silicoethane (Si2H6) and a higher silane (SinH>2n+2<) are also predictable, but not limited thereto. The silicon-containing raw gas can be mixed with one or more halogen-containing gases, where the halogen containing gas is to meant any one of: chlorine (Cl2), hydrogen chloride (HCl), bromine (Br2), hydrogen bromide (HBr), iodine (I2), hydrogen iodide (HI), and a mixture thereof, preferably hydrogen chloride, which inhibits the nucleation to form silicon powder or the atomization. The silicon-containing raw gas can also be mixed with one or more other gases, such as the fluidizing gas, comprising hydrogen or being one or more inert gases selected from the group consisting of nitrogen (N2), helium (He), argon (Ar), and neon (Ne), preferably nitrogen or argon. In a specific embodiment, the silicon-containing raw gas is silane or trichlorosilane, and the silane or trichlorosilane is mixed with hydrogen.

The silicon-containing raw gas, together with any accompanying hydrogen, halogen containing gas and/or an inert gas, is fed through the nozzle into the fluidized bed reactor, and decomposed in the reactor to generate silicon, which is deposited on the seed particles inside the reactor. The way of feeding the silicon-containing raw gas into the fluidized bed can be: mixing the several types of gas followed by feeding together, or feeding independently through a separate conduit and nozzle, or feeding through the gas distributor into the fluidized bed, or feeding the silicon-containing gas through a nozzle while feeding hydrogen and/or the inert gas through the distributor. In an embodiment, a mixed gas comprising the silicon-containing raw gas and the fluidizing gas, and optionally the halogen containing gas is fed into the fluidized bed. The silicon-containing raw gas is preferably preheated to about 300 to about 500° C. before feeding into the fluidized bed reactor. Preheating the seed with the raw gas can provide a part of heat to the fluidized bed reactor. Particularly in the start up stage, by preheating the seed with the raw gas, the granular silicon seed is heated to about 300 to about 500° C., at which the electric conductivity of silicon is increased dramatically, such that silicon becomes an electric conductor. Subsequently, the silicon particles can release heat, via the way of induction heating, to provide an adequate reaction temperature to the fluidized bed.

The reaction temperature of the fluidized bed reactor can vary corresponding to specific materials For example, regarding a silane fluidized bed, as the thermolysis temperature of silane is lower than that of trichlorosilane, the bed temperature of the fluidized bed can be about 600° C. to about 800° C., preferably about 650° C. to about 750° C., more preferably about 650° C. to about 700° C. As compared, a trichlorosilane (or called as SiHCl3) fluidized bed can have a bed temperature of about 900° C. to about 1200° C., preferably about 950° C. to about 1150° C., more preferably about 1000° C. to about 1050° C.

The input of the silicon-containing raw gas and the fluidizing gas is such that the gas flow rate is about 1.1 to about 4.0 Umf, but not limited thereto. For example, it is also possible to be about 1.0 to about 8.0 Umf, or about 2.0 to about 5.0 Umf, preferably about 1.2 to about 2.0 Umf. Correspondingly, the residence time is generally less than about 12 s, less than about 9 s, or less than about 4 s. There is not any specific limitation on the proportion of the silicon-containing raw gas in the feeding gas, e.g., about 20 mol % to about 80 mol % of the silicon-containing raw gas, the remainder being the fluidizing gas, but not limited thereto. The content of the silicon-containing raw gas can refer to the prior art, which is known by those skilled in the art. The fluidized bed reactor can be pressured for reaction, to have a pressure of about 0.1 to about 0.8 MPa, preferably about 0.3 to about 0.5 MPa, but not limited thereto.

Generally, the silicon seed and/or the silicon-containing raw gas and/or the fluidizing gas are preheated to about 300 to about 500° C. prior to being fed into the fluidized bed reactor, preferably preheated to about 350° C. to about 450° C., more preferably to about 400° C. The preheating way can be achieved by any ordinary technical means in the art, e.g., heat exchanging with the reaction tail gas or conventional heating by electric heater or microwave. Preheating the feeding gas and the silicon seed benefits reducing the load of the induction heating device and supplying a part of the heat. In particular, the seed is preheated to about 400 to about 500° C., where the silicon seed becomes a good conductor, which can be heated rapidly by simple induction heating with a high heating efficiency.

In order to avoid the silicon deposition caused by a too high temperature on the gas distributor, the distributor has a three-layer construction, wherein one of the three is a cooling fluid cavity placed below the upper plate of the distributor, which cools the fluid distributor and the feeding nozzle to prevent the distributor surface or nozzle surface from silicon deposition which may otherwise plug the feeding nozzle to affect adversely the production capacity. Generally, a cooling fluid at a temperature of about 30 to about 500° C. is introduced into the cooling fluid cavity of the distributor to cool the distributor to a temperature lower than the decomposition temperature of the silicon-containing raw gas, e.g., as low as about 300 to about 500° C., preferably lower than about 400° C., more preferably lower than about 350° C., further preferably lower than about 300° C., so as to avoid silicon deposition on the distributor surface, which otherwise clogs the feeding nozzle and influences adversely the production capacity. The cooling fluid can be gas or liquid, such as cooling water, heat transfer oil, hydrogen or inert gas, preferably hydrogen or inert gas, e.g., nitrogen or argon.

The silicon particles, also called as silicon granules or silicon seed, means the particles composing the bed layer of the fluidized bed, which are also generally called as bed granules in the fluidized bed of producing granular silicon; while the seed after growing to the target size is called the product of high purity granular polysilicon.

The subsequent procedures for the process of producing high purity granular polysilicon according to the present invention can refer to the prior art, which is known by those skilled in the art. For example, the procedures of sorting, packaging, recovery of tail gas, separation, preparation of seed of the product are known.

Generally, for the use in a fluidized bed reactor, the particle size of the granular silicon seed is about 50-1000 μm, preferably about 100 to about 500 μm; while the product of the granular polysilicon produced has generally a particle size of about 500 to about 3000 μm, preferably about 800 to about 2000 μm.

Although the embodiments of the invention have been discussed and illustrated above, it should be understood that those skilled in the art can make various equivalent change and modification to the embodiments according to the conception of the invention, which still fall in the protection scopes of the invention, as long as the functions thereof are encompassed by the spirit of the invention.

What is claimed is:

1. A fluidized bed reactor, comprising:
   a reaction tube;
   a distributor at a bottom of the reaction tube; and
   a heating device;
   wherein the reaction tube and the distributor at the bottom of the reaction tube define a closed space;
   the distributor comprises a gas inlet and a product outlet;
   the reaction tube comprises:
      a tail gas outlet;
      a seed inlet respectively at an upper part;
      a reaction inner tube; and
      a reaction outer tube;
   the heating device is an induction heating device placed within a hollow cavity formed between an external wall of the reaction inner tube and an internal wall of the reaction outer tube;
   the hollow cavity is filled with hydrogen, nitrogen or inert gas for protection, and is structured to maintain a pressure of about 0.01 to about 5 MPa;
   the distributor comprises three layers comprising an upper plate, an intermediate plate, and a lower plates;
   the upper plate and the intermediate plate define a cavity for a cooling fluid connecting with an inlet/outlet conduit of the cooling fluid;
   the intermediate and lower plates define a cavity for a mixed feeding gas connecting with a feeding gas conduit; and
   the mixed gas comprising a silicon-containing raw gas and a fluidizing gas is ejected into the fluidized bed reactor through one or more nozzles.

2. The fluidized bed reactor according to claim 1, wherein the induction heating device is provided in form of one or more sets of induction coils, and the induction coil twists around the reaction inner tube taking the central axis of the reaction inner tube as the central axis.

3. The fluidized bed reactor according to claim 2, wherein 2-10 sets of the induction coil are provided.

4. The fluidized bed reactor according to claim 3, wherein the reaction inner tube further comprises a liner on the inside, the liner and/or the reaction outer tube having a detachable structure.

5. The fluidized bed reactor according to claim 4, wherein the liner is made of quartz, graphite or silicon carbide.

6. The fluidized bed reactor according to claim 5, wherein the graphite or silicon carbide liner has a costing of at least one of quartz, silicon carbide, silicon nitride and silicon on its internal surface.

7. The fluidized bed reactor according to claim 3, wherein the reaction inner tube further comprises a thermal insulating layer on the outside, which thermal insulating layer is made of at least one heat-insulating material of ceramics and C-C composite.

8. The fluidized bed reactor according to claim 1, wherein the reaction outer tube is made of at least one of metal, metal alloy, carbon steel, stainless steel and other alloy steel, and/or the reaction inner tube is made of at least one of quartz, graphite, silica, silicon carbide, silicon nitride, boron nitride, zirconia and silicon.

9. The fluidized bed reactor according to claim 1, wherein the fluidized bed reactor further comprises an inside preheating/heating device, inside the fluidized bed reactor.

10. The fluidized bed reactor according to claim 9, wherein the inside preheating/heating device is a ferromagnetic member extending into the reactor.

11. The according to claim 9, wherein a protective case is placed on the periphery of the inside preheating/heating device, which protective case is made of at least one inorganic material non-deformable at high temperatures selected from quartz, silica, silicon nitride, boron nitride, zirconia, yttria and silicon.

12. The fluidized bed reactor according to claim 11, wherein the protective case is hollow and is porous on the outer surface, wherein the hollow part of the protective case is fed with a protective gas.

* * * * *